(12) United States Patent
Bruck

(10) Patent No.: US 10,415,390 B2
(45) Date of Patent: Sep. 17, 2019

(54) REPAIR OF DIRECTIONALLY SOLIDIFIED ALLOYS

(71) Applicant: Gerald J. Bruck, Oviedo, FL (US)

(72) Inventor: Gerald J. Bruck, Oviedo, FL (US)

(73) Assignee: SIEMENS ENERGY, INC., Orlando, FL (US)

( * ) Notice: Subject to any disclaimer, the term of this patent is extended or adjusted under 35 U.S.C. 154(b) by 626 days.

(21) Appl. No.: 13/658,866

(22) Filed: Oct. 24, 2012

(65) Prior Publication Data

US 2013/0302533 A1    Nov. 14, 2013

Related U.S. Application Data

(60) Provisional application No. 61/645,800, filed on May 11, 2012.

(51) Int. Cl.
*F01D 5/00* (2006.01)
*B23K 26/34* (2014.01)
*B23K 26/32* (2014.01)
*B23K 26/342* (2014.01)
*B23K 103/00* (2006.01)

(52) U.S. Cl.
CPC .............. *F01D 5/005* (2013.01); *B23K 26/32* (2013.01); *B23K 26/34* (2013.01); *B23K 26/342* (2015.10); *B23K 2103/50* (2018.08); *F05D 2230/31* (2013.01); *F05D 2300/606* (2013.01)

(58) Field of Classification Search
CPC .. B23K 26/3206; B23K 26/34; B23K 26/345; F01D 5/005
See application file for complete search history.

(56) References Cited

U.S. PATENT DOCUMENTS

| 4,323,756 | A |   | 4/1982  | Brown et al.   |         |
|-----------|---|---|---------|----------------|---------|
| 4,781,770 | A |   | 11/1988 | Kar            |         |
| 4,818,562 | A | * | 4/1989  | Arcella et al. | 427/597 |
| 4,878,953 | A |   | 11/1989 | Saltzman et al.|         |
| 5,622,638 | A |   | 4/1997  | Schell et al.  |         |
| 5,855,149 | A |   | 1/1999  | Islam et al.   |         |
| 6,024,792 | A | * | 2/2000  | Kurz et al.    | 117/9   |
| 6,049,978 | A |   | 4/2000  | Arnold         |         |
| 6,331,361 | B1|   | 12/2001 | Esch et al.    |         |
| 6,491,207 | B1|   | 12/2002 | Smashey et al. |         |
| 7,034,262 | B2|   | 4/2006  | Fischer et al. |         |

(Continued)

FOREIGN PATENT DOCUMENTS

| EP | 0581548 A1 | 2/1994 |
|----|------------|--------|
| JP | 63230264 A | 9/1988 |

(Continued)

*Primary Examiner* — Dah-Wei D. Yuan
*Assistant Examiner* — Nga Leung V Law

(57) ABSTRACT

A method for epitaxial addition of repair material onto a process surface (38) of a directionally solidified component (30). The component is positioned in a fluidized bed (34) to drift particles of a repair material over the process surface as laser energy (36) is rastered across the surface to melt the particles and to fuse repair material onto the entire surface simultaneously. The component is moved downward (39) in the bed in a direction parallel to the grain orientation in the component as material is added to the surface, thereby providing continuous epitaxial addition of material to the surface without recrystallization.

19 Claims, 2 Drawing Sheets

(56) References Cited

U.S. PATENT DOCUMENTS

| | | |
|---|---|---|
| 7,784,668 B2 | 8/2010 | Shubert |
| 8,141,769 B2 | 3/2012 | Ott et al. |
| 2004/0232583 A1* | 11/2004 | Monsheimer et al. ....... 264/113 |
| 2007/0138238 A1* | 6/2007 | Shubert .................. B23P 6/002 228/119 |
| 2007/0228108 A1 | 10/2007 | Goldschmidt et al. |

FOREIGN PATENT DOCUMENTS

| | | |
|---|---|---|
| JP | 09110596 A | 4/1997 |
| JP | 2005152918 A | 6/2005 |
| JP | 2005522342 A | 7/2005 |
| JP | 2009288480 A | 12/2009 |
| JP | 2011149419 A | 8/2011 |
| RU | 2257285 C1 | 7/2005 |
| RU | 2354523 C1 | 5/2009 |

* cited by examiner

US 10,415,390 B2

REPAIR OF DIRECTIONALLY SOLIDIFIED ALLOYS

This application claims benefit of the 11 May 2012 filing date of U.S. provisional patent Application No. 61/645,800.

FIELD OF THE INVENTION

The invention relates generally to the field of materials, and more specifically to the repair of directionally solidified alloys.

BACKGROUND OF THE INVENTION

High temperature, high stress machine applications such as gas turbine engines have required the development of nickel and cobalt based superalloys. Components formed of such alloys may be cast to be equiaxed (random polycrystalline structure), or to be columnar grained (crystal grains formed parallel to a major stress axis), or to be a single crystal (no grain boundaries). Columnar grained and single crystal structures are formed by directionally solidifying molten alloy material during the casting process, and such structures can provide performance benefits for certain applications.

It is desired to repair a directionally solidified superalloy component rather than to replace it in order to reduce cost. However, repair of such materials is difficult because the repair process can destroy the directionality of the underlying crystal structure, thereby weakening the component.

U.S. Pat. No. 8,141,769 discloses a repair process for directionally solidified materials wherein a solder is applied in the repair region at a temperature which is low enough not to change the crystal structure of the underlying substrate material, and a temperature gradient is induced to produce a directionally solidified grain structure in the solder material. While this process preserves the underlying grain structure, it is limited to local repairs having a width of 1-1,000 µm. Furthermore, the need for a low melting temperature constituent in the solder limits the selection of materials that may be used for the repair.

U.S. Pat. No. 7,784,668 discloses the use of a preform shape of repair material that is melted and allowed to solidify onto a directionally solidified substrate, thereby preferentially seeding and orienting with the substrate material grains. However, the thickness of the preform shape must be limited due to the fluidity and limited surface tension of the molten additive material. Thicker repairs must be accomplished by sequentially applying multiple preform shapes in a series of repetitive, duplicative steps, or otherwise a container or mold must be provided to support the repair material in its molten state.

Superalloy airfoils of gas turbine engines are most commonly repaired by incrementally depositing layers of repair material onto the airfoil substrate surface with a welding or cladding process. The repair material is selected to match the substrate material or to have similar high temperature properties. Such cladding repairs may be accomplished with gas tungsten arc welding (GTAW) using wire as the filler material, or for lower heat applications, with microplasma arc welding (PAW) or laser beam welding (LBW) usually using powder material as the filler material. Many variations of this technology have been developed, including preweld heat treat conditioning of the substrate, elevated temperature preheating of the substrate, and post weld heat treatments such as hot isostatic pressing (HIPing). However, such welding processes fail to replicate the microstructure of the underlying substrate, and thus they are unable to produce materials properties equal to those achieved in the original component.

BRIEF DESCRIPTION OF THE DRAWINGS

The invention is explained in the following description in view of the drawings that show.

DETAILED DESCRIPTION OF THE INVENTION

Figure 1:
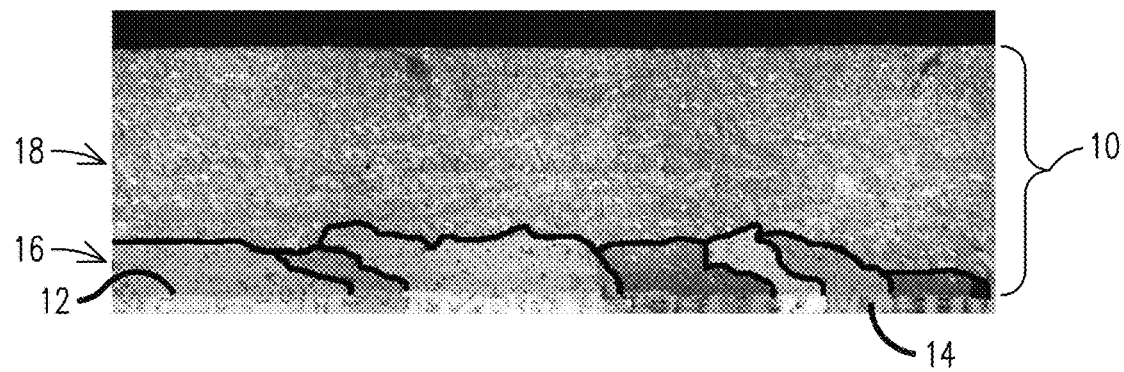
FIG. 1 is a photomicrograph of a surface of a directionally solidified component repaired with a prior art layering process.
Figure 2:
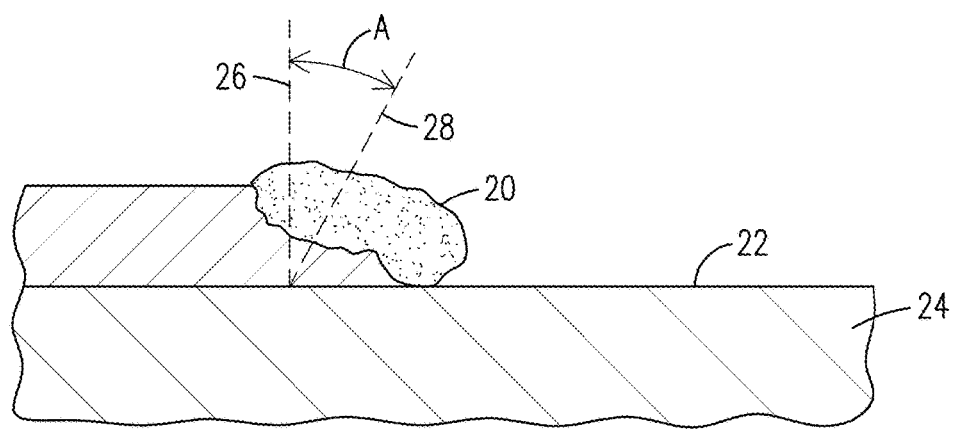
FIG. 2 is a schematic illustration of the melt pool region of a surface during a prior art layering repair process.

FIG. 1 is a photomicrograph illustrating the result of a typical prior art weld cladding repair, showing a multi-layer clad region 10 deposited over a surface 12 of a directionally solidified substrate material 14. In a lowermost portion 16 of the clad region 10, directionally solidified extensions of the substrate grains are highlighted in the figure with black lines. However, those grains terminate after a few layers of cladding and are covered by an uppermost portion 18 of the clad region 10 wherein recrystallization has occurred and the grains are no longer directionally solidified. The present inventor has recognized that this is the result of the local direction of process solidification achieved during the clad layering process. FIG. 2 is a schematic illustration explaining how this occurs.

FIG. 2 shows a profile view of a melt pool 20 of clad material progressing along a surface 22 of a directionally solidified substrate 24. The grains of the substrate 24 extend in a direction generally perpendicular to the surface 22 along substrate grain axis 26. However, due to the movement of the melt pool 20 (left to right in the illustration of FIG. 2), solidification of the pool material actually occurs in a direction at a slight angle A inclined from the direction of the substrate grains along a solidification axis 28. If the solidification axis direction 28 is not excessively inclined to the substrate grain axis 26, the substrate grains will extend epitaxially (with the same crystallographic orientation) into the clad material. The first and often the second of such layers may advance the substrate grains a short distance, as illustrated in FIG. 1. However, repeated processing of subsequent layers will inevitably encounter more preferred grain growth directions because solidification continues to be at an angle to the underlying microstructure, and other grain orientations are more favorably oriented to the direction of solidification 28. The result is that the directionally solidified or single crystal microstructure is no longer advanced, and recrystallization ensues in its place, as shown in the uppermost portion 18 of the clad region 10 of FIG. 1. For very crack sensitive alloys, such as the nickel alloy sold under the trademarks MAR-M-247 or CM 247, deposit cracking initiates together with such changes in microstructure. This likely occurs because precipitations in such complex microstructures strain the newly oriented grain boundaries and thus initiate microcracks.

Recognizing the cause of the recrystallization in multi-layer cladding deposited over directionally solidified substrate material, the present inventor has innovatively developed an improved process for the repair of directionally solidified cast materials. The improved process overcomes the limitations of prior art processes by preserving the directionally solidified microstructure of the underlying substrate, extending that directional microstructure into the repair material, and allowing an essentially unlimited thickness of directionally solidified repair material to be added.

Figure 3:
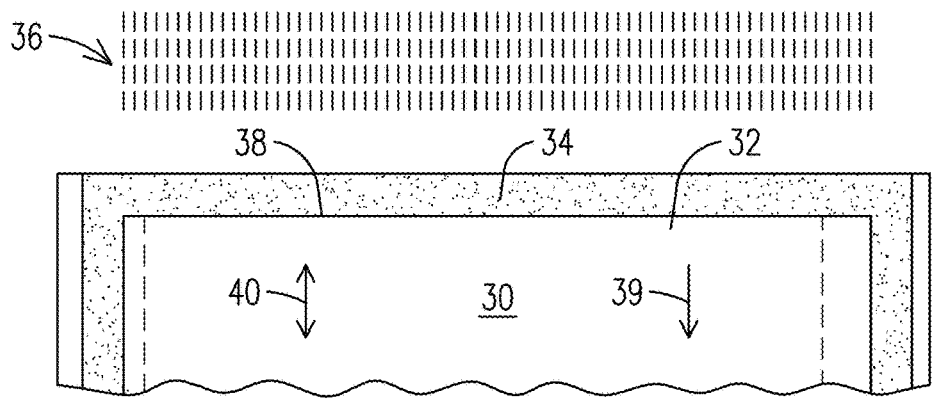
FIG. 3 is a schematic illustration of a gas turbine blade undergoing a repair process in accordance with an embodiment of the invention.
Figure 4:
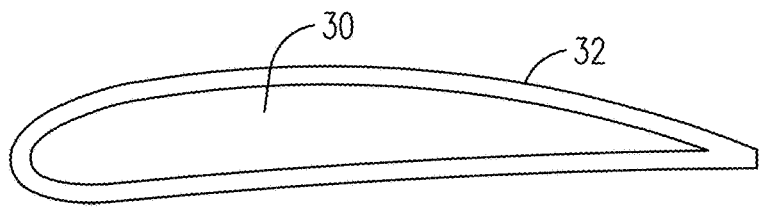
FIG. 4 is a top view of the blade of FIG. 3.

FIG. 3 is a schematic illustration of one embodiment of the invention, where a directionally solidified (single crystal or columnar grained) gas turbine blade 30, seen in elevation view, is undergoing a material additive processes to repair its squealer tip 32. The term "squealer tip" is used in the art to describe an extension of the blade material along peripheral edges of the blade 30, as can be seen in FIG. 4, which is a top view of blade 30 showing the location and geometry of the squealer tip 32, with other structures of FIG. 3 hidden. A squealer tip is designed to wear upon making intermittent contact with a shroud surrounding the blade during operation of a gas turbine engine. Repair of a squealer tip generally involves removing worn material, then building up a new tip with a material additive process. In the embodiment of the invention illustrated in FIG. 3, the blade 30 is submerged in a fluidized bed 34 of repair material powder. The fluidized bed 34 mobilizes powder onto the entire top surface process area of the squealer tip 32, while laser energy 36 is applied across the entire process area to melt the powder and fuse it to the underlying blade surface 38 in a continuous laser casting process. In this embodiment, powder is fed into the fluidized bed 34 at a rate equal to the rate that it is being consumed in the process so that the level of powder remains essentially constant. As the squealer tip 32 grows upward, the blade 30 is moved downward and away from the source of the laser energy 36 (as indicated by arrow 39), such that the active process surface remains approximately vertically stationary and the powder drift over the process plane is constant. Thus, the powder is melted and fused in a continuous fashion as the squealer tip 32 is applied. The laser energy 36 may be applied by rapidly scanning or rastering a laser beam in two dimensions as necessary to heat the entire processing surface (i.e. entire top surface area of the squealer tip 32 as seen in FIG. 4). By doing so, and by moving the blade 30 in a direction 39 parallel to the axis 40 of the original casting solidification (blade substrate grain direction), the heat conduction and solidification is effective to extend the substrate microstructure uniaxially and epitaxially without recrystallization. By using an inert gas such as argon as the mobilizing fluid in the fluidized bed 34, the blade 30 and melt surface 38 are also protected from undesirable atmospheric reactions such as oxidation and nitridation. The entire process interface is simultaneously under a continuous condition of melting and solidification exactly in the original cast direction, and is not being rebuilt incrementally across its surface with individually solidified passes of progression at an angle to the substrate grain orientation, thereby making possible the replication and extension of the substrate microstructure to any desired thickness.

Figure 5:
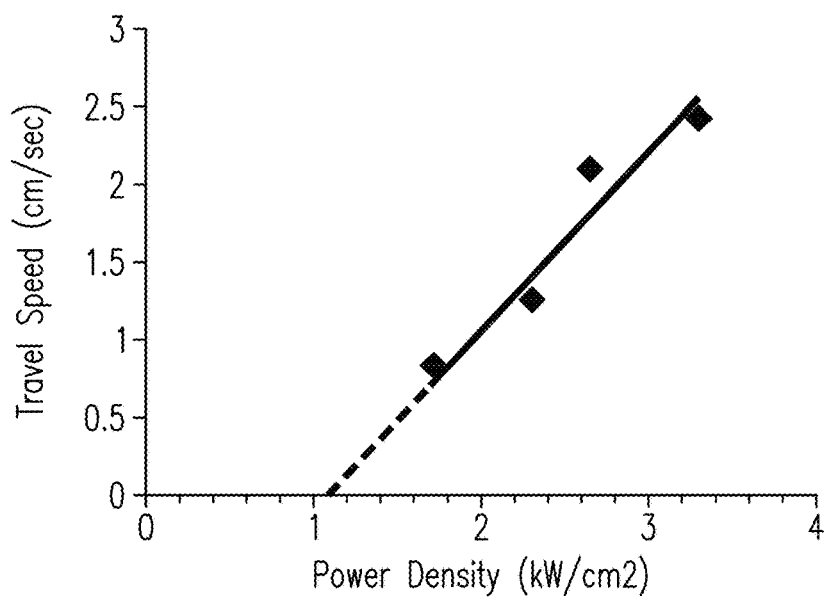
FIG. 5 is a plot of data showing substrate melting as a function of travel speed and power density.

Significant levels of laser power are required to accomplish the continuous laser casting illustrated in FIG. 3. FIG. 4 is a plot of surface melting achieved on a bare steel substrate as a function of travel speed and laser power density. Extrapolating to lower travel speeds would suggest that laser power density of about 1 kW/cm$^2$ should produce melting at essentially zero travel speed, which represents the uniaxial laser casting process described above. With powder addition, energy loss from surface reflection will be reduced from the results of FIG. 5 because powder is known to act as an effective trap for laser light. Because the coupling of the laser beam will be more efficient, the melting of the powder and fusion to the substrate may be expected at power densities perhaps as low as 0.6 kW/cm$^2$. If the substrate is preheated, even lower power densities may be expected to sustain melting, perhaps as low as 0.4 kW/cm$^2$. At that power density, a commercially available 8 kW laser power source could be used to process a repair area of 20 cm$^2$. That size is large compared to the size of a typical gas turbine blade platform repair, and is about the same as the top surface area of a typical gas turbine blade squealer tip 32. Lasers with even higher power capabilities are already known; for example, the Edison Welding Institute has demonstrated the use of a polygon optical scanner with a fiber laser at power levels up to 10 kW for a paint stripping application. High power diode or $CO_2$ lasers may be used with integrated or scanned optics in lieu of a rastered fiber laser beam, with the shape of the process area exposed to laser energy being controlled by the optics and/or masks to expose the entire process area to laser energy simultaneously.

Advantageously, the present invention provides for the epitaxial extension of directionally solidified microstructures in superalloy materials for any repair area shape to an unlimited depth while avoiding recrystallization and cracking. The invention also requires less time than multiple pass processes while avoiding interpass temperature limitations and interpass cleaning concerns. Complex manipulation of the part being repaired is not required, since laser beam rastering distributes power over the process surface and the only other motion required is vertical part displacement relative to the laser beam.

An apparatus for practicing the invention may include a means for mobilizing particles of material 34 over a process surface of a substrate 30; a means for applying energy 36 across the entire process surface in a manner effective to melt and fuse the material epitaxially onto the entire process surface simultaneously; and a means for providing relative motion 39 between the substrate and the means for mobilizing particles of material effective to maintain conditions for continuous epitaxial addition of the material to the substrate until a desired thickness of the material is added. The means for providing relative motion may be a motor driven platform or other mechanical device as would be known to one skilled in the art of fixturing.

While various embodiments of the present invention have been shown and described herein, it will be obvious that such embodiments are provided by way of example only. Numerous variations, changes and substitutions may be made without departing from the invention herein. For example, powder may be mobilized to move onto the process surface by means other than a fluidized bed, such as by a shaker system that oscillates the substrate or a container holding the particles, by applying acoustic, electric or magnetic energy to mobilize the particles, by the use of a broadcast spray system, etc. The part may be conditioned or heated before or after the material additive process by any variety of processes known in the art. The part may be insulated on its sides to more closely simulate heat conditions originally experienced during the original casting of the part. Various powder mesh ranges may be used in various applications to optimize particle movement and process results. The powder material and/or mesh range may be held constant or may be varied as the repair progresses. Rather than moving the part downward in a stationary fluidized bed with a stationary laser energy source, any combination of the particle supply, part and energy source may be moved relative to each other to maintain the continuous melt/fuse conditions with a solidification surface that is perpendicular to the direction of grain orientation and that is moving parallel to the direction of grain orientation. Finally, energy other than laser energy may be used, such as electromagnetic or acoustic energy, so long as the energy source is capable of heating and melting the powder continuously over the entire process area.

Accordingly, it is intended that the invention be limited only by the spirit and scope of the appended claims.

The invention claimed is:

1. A method for epitaxial additional of repair material to a surface of a directionally solidified substrate material, the method comprising:
    mobilizing a continuous supply of particles of repair material onto an entire process surface of the substrate material;
    applying energy across the entire process surface in a manner effective to melt and fuse the repair material epitaxially onto the entire process surface simultaneously under a continuous condition of melting and solidification and not being rebuilt incrementally across the surface with individually solidified passes of progression, such that a solidification process interface of the fused particles progresses in a direction parallel to a grain orientation direction of the substrate material; and
    providing relative motion between the continuous supply of repair material particles, a source of the energy, and the substrate material effective to maintain conditions for the continuous epitaxial addition of the repair material at the solidification process interface until a desired thickness of the repair material is added.

2. The method of claim 1, wherein the step of mobilizing a continuous supply of repair material particles comprises disposing the substrate material in a fluidized bed of the repair material particles.

3. The method of claim 2, further comprising using an inert gas as a mobilizing fluid in the fluidized bed.

4. The method of claim 1, wherein the step of mobilizing a continuous supply of repair material particles comprises applying the repair material particles by a broadcast spray.

5. The method of claim 1, wherein the step of mobilizing a continuous supply of repair material particles comprises vibrating the substrate material.

6. The method of claim 1, wherein the step of mobilizing a continuous supply of repair material particles comprises disposing the substrate material in a bed of the repair material particles and vibrating the bed.

7. The method of claim 1, wherein the step of applying energy comprises rastering a laser beam across the entire process surface.

8. The method of claim 1, wherein the step of applying energy comprises directing laser energy through optics to the entire process surface simultaneously.

9. The method of claim 1, wherein the step of providing relative motion comprises lowering the substrate material relative to a particle surface in a fluidized bed of the particles of repair material.

10. The method of claim 9, further comprising using an inert gas as a mobilizing fluid in the fluidized bed.

11. The method of claim 1 used to add material to a squealer tip of a gas turbine blade formed of directionally solidified superalloy material.

12. A method for repair of a directionally solidified gas turbine engine component, the method comprising:
    disposing the component in a fluidized bed of repair material particles;
    activating the fluidized bed to mobilize movement of a flow of the particles onto a repair surface of the component;
    rastering laser energy across the repair surface to melt and fuse particles epitaxially onto the entire repair surface simultaneously under a continuous condition of melting and solidification and not being rebuilt incrementally across the surface with individually solidified passes of progression, such that a solidification process interface of the fused particles progresses along an axis parallel to a grain orientation direction of the component; and
    moving the component downward in the fluidized bed along the axis as the solidification process interface progresses to maintain a continuous epitaxial extension of grain microstructure on the component.

13. The method of claim 12 applied to repair a squealer tip of a gas turbine blade.

14. The method of claim 12, further comprising using an inert gas as a mobilizing fluid in the fluidized bed.

15. A method for epitaxial additional of material to a surface of a directionally solidified substrate, the method comprising:
    mobilizing particles of material over a process surface of the substrate;
    applying energy across the entire process surface in a manner effective to melt and fuse the material epitaxially onto the entire process surface simultaneously under a continuous condition of melting and solidification and not being rebuilt incrementally across the surface with individually solidified passes of progression; and
    maintaining the substrate in a position relative to the particles of material and the applied energy effective to maintain conditions for continuous epitaxial addition of the material to the substrate until a desired thickness of the material is added.

16. The method of claim 15, further comprising mobilizing the particles of material in a fluidized bed to drift the particles onto the process surface.

17. The method of claim 16, further comprising lowering the substrate in the fluidized bed as the material is added to the substrate to maintain a position of the process surface relative to a surface of the particles in the fluidized bed.

18. The method of claim 17, further comprising applying the energy by rastering a laser beam across the process surface in a continuous manner.

19. The method of claim 18, further comprising using an inert gas as the mobilizing fluid in the fluidized bed.

\* \* \* \* \*